United States Patent
Zelesky et al.

(10) Patent No.: US 10,815,814 B2
(45) Date of Patent: Oct. 27, 2020

(54) RE-USE AND MODULATED COOLING FROM TIP CLEARANCE CONTROL SYSTEM FOR GAS TURBINE ENGINE

(71) Applicant: UNITED TECHNOLOGIES CORPORATION, Farmington, CT (US)

(72) Inventors: Mark F. Zelesky, Bolton, CT (US); Brian Merry, Andover, CT (US); Gabriel L. Suciu, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 903 days.

(21) Appl. No.: 15/588,911

(22) Filed: May 8, 2017

(65) Prior Publication Data

US 2018/0320541 A1 Nov. 8, 2018

(51) Int. Cl.
*F01D 11/20* (2006.01)
*F01D 11/24* (2006.01)
*F01D 11/16* (2006.01)
*F01D 11/14* (2006.01)

(52) U.S. Cl.
CPC .............. *F01D 11/20* (2013.01); *F01D 11/14* (2013.01); *F01D 11/16* (2013.01); *F01D 11/24* (2013.01)

(58) Field of Classification Search
CPC .......... F01D 11/20; F01D 11/24; F01D 11/14; F01D 11/16
See application file for complete search history.

(56) References Cited

U.S. PATENT DOCUMENTS

| | | | | |
|---|---|---|---|---|
| 3,975,901 A | * | 8/1976 | Hallinger | F01D 11/16 60/786 |
| 4,050,843 A | * | 9/1977 | Needham | F01D 11/18 415/116 |
| 4,222,707 A | * | 9/1980 | Drouet | F01D 11/08 415/116 |
| 4,230,436 A | * | 10/1980 | Davison | F01D 11/24 415/1 |

(Continued)

FOREIGN PATENT DOCUMENTS

GB 2316134 2/1998
WO 2004/097181 A1 11/2004

OTHER PUBLICATIONS

European Search Report for EP Application No. 18170848.8 dated Oct. 22, 2018.

*Primary Examiner* — Christopher S Bobish
(74) *Attorney, Agent, or Firm* — Carlson, Gaskey & Olds, P.C.

(57) ABSTRACT

A control system for a gas turbine engine comprises a case structure, a clearance control ring mounted for movement relative to the case structure, an outer air seal mounted to the clearance control ring and facing a first engine component, and a control and valve assembly that receives flow from a flow input source. The control and valve assembly is configured to direct flow into a first cavity positioned radially between the case structure and the outer air seal, and wherein the control and valve assembly is configured to direct flow into a second cavity positioned downstream of the first cavity to interact with a second engine component. A method of controlling flow between a compressor section and turbine section is also disclosed.

11 Claims, 3 Drawing Sheets

(56) References Cited

U.S. PATENT DOCUMENTS

| | | | |
|---|---|---|---|
| 4,304,093 A * | 12/1981 | Schulze | F01D 11/24 60/39.091 |
| 4,317,646 A | 3/1982 | Steel et al. | |
| 4,363,599 A * | 12/1982 | Cline | F01D 11/18 415/136 |
| 4,513,567 A * | 4/1985 | Deveau | F01D 11/08 415/178 |
| 4,596,116 A | 6/1986 | Mandet et al. | |
| 4,668,164 A * | 5/1987 | Neal | F01D 9/041 415/116 |
| 4,928,240 A * | 5/1990 | Davison | F01D 11/24 415/116 |
| 5,154,578 A | 10/1992 | Miraucourt et al. | |
| 5,281,085 A * | 1/1994 | Lenahan | F01D 11/24 415/116 |
| 5,553,999 A * | 9/1996 | Proctor | F01D 11/08 415/134 |
| 5,593,278 A * | 1/1997 | Jourdain | F01D 11/18 415/116 |
| 5,971,703 A * | 10/1999 | Bouchard | F01D 25/246 415/135 |
| 6,152,685 A * | 11/2000 | Hagi | F01D 11/10 415/116 |
| 6,666,645 B1 * | 12/2003 | Arilla | F01D 11/24 415/116 |
| 6,925,814 B2 * | 8/2005 | Wilson | F01D 11/10 415/178 |
| 8,480,353 B2 * | 7/2013 | Koyabu | F01D 9/04 415/116 |
| 9,103,225 B2 * | 8/2015 | Lutjen | F01D 11/08 |
| 9,157,331 B2 * | 10/2015 | Laurello | F01D 11/24 |
| 9,598,974 B2 * | 3/2017 | Gekht | F01D 11/24 |
| 10,370,999 B2 * | 8/2019 | Blaney | F01D 11/22 |
| 2009/0208321 A1 * | 8/2009 | O'Leary | F01D 11/24 415/14 |
| 2015/0003958 A1 | 1/2015 | Uskert et al. | |
| 2016/0053624 A1 | 2/2016 | McCaffrey et al. | |
| 2016/0237842 A1 | 8/2016 | Blaney et al. | |
| 2016/0326915 A1 * | 11/2016 | Baladi | F01D 11/24 |

\* cited by examiner

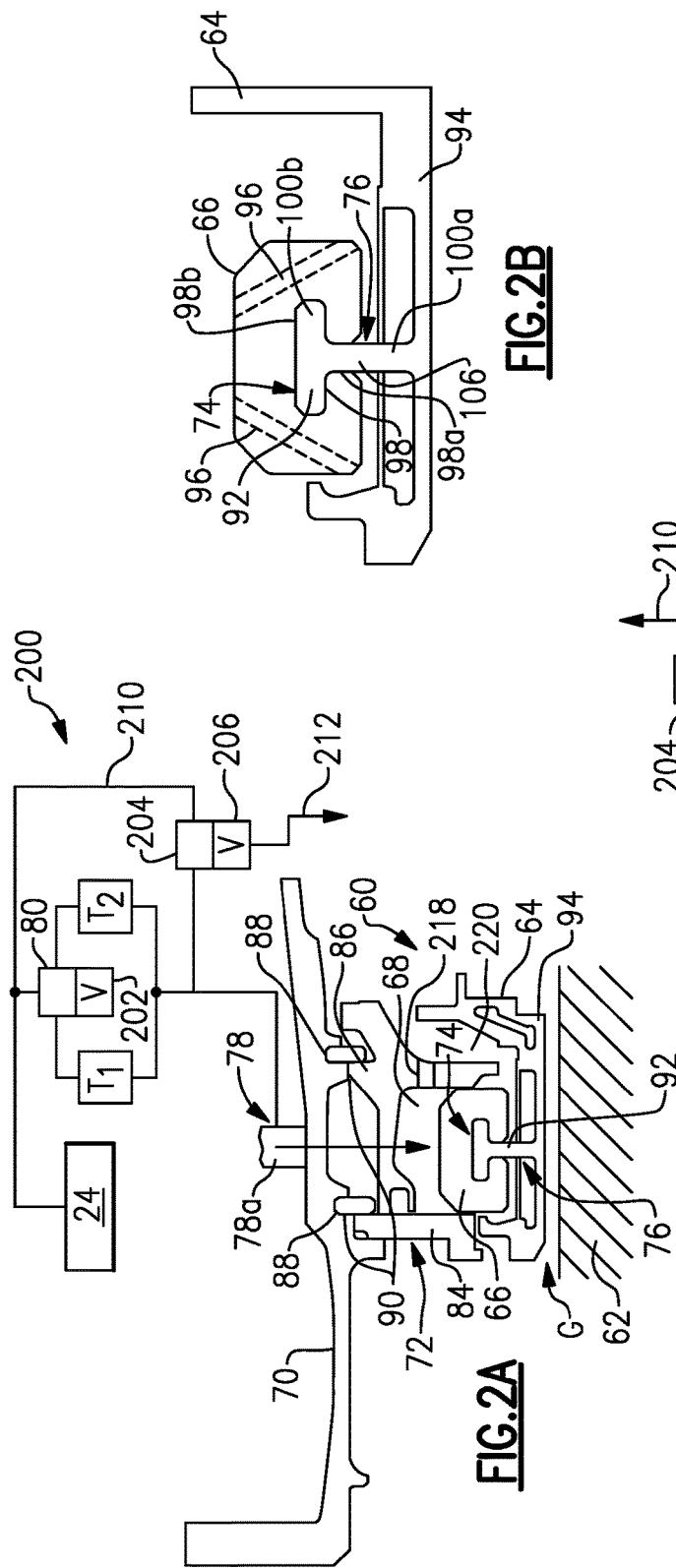
FIG.2A
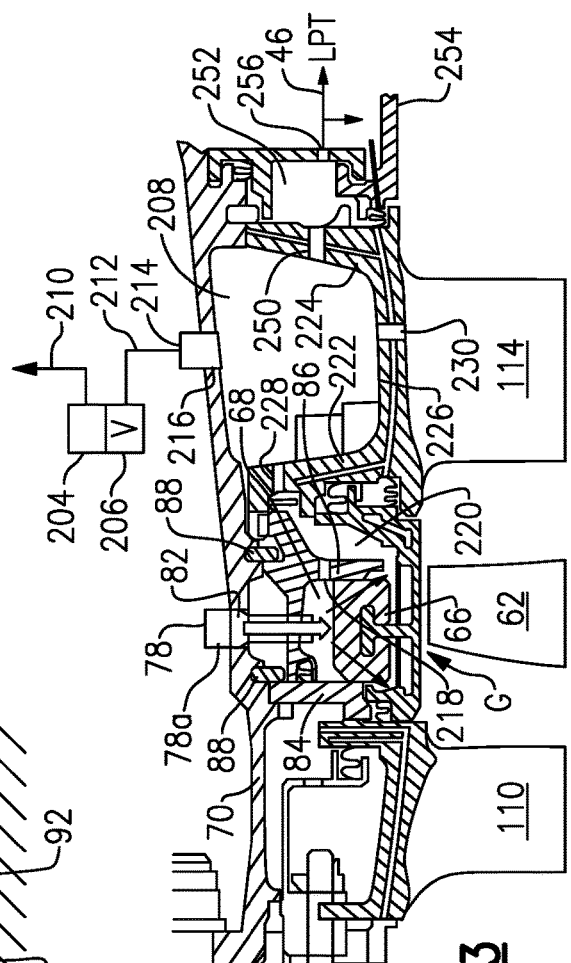
FIG.2B
FIG.3

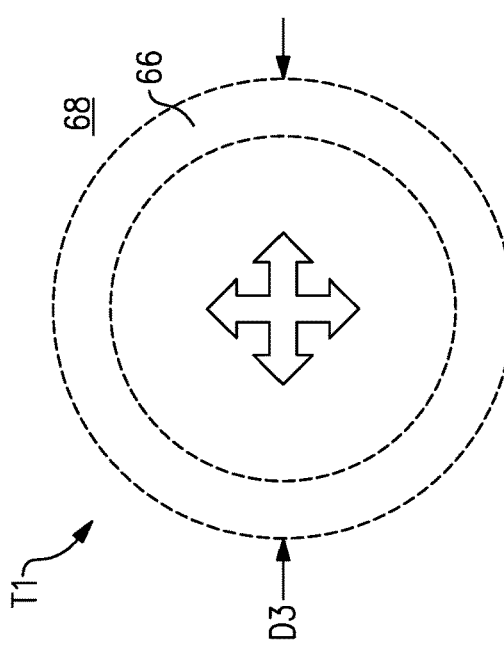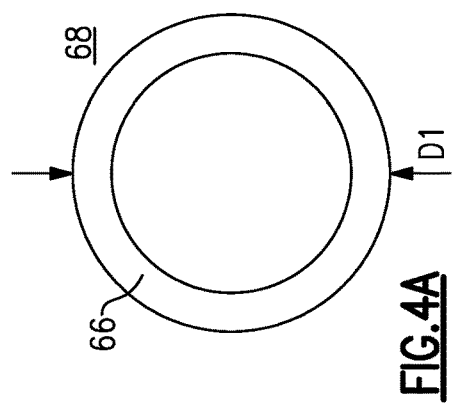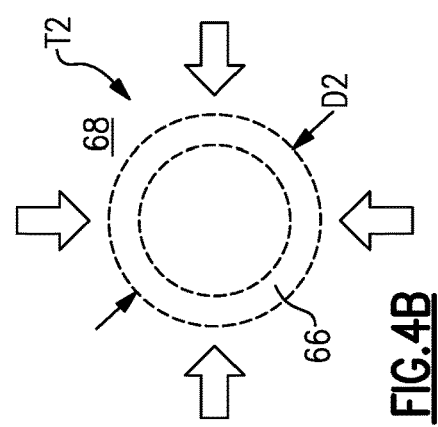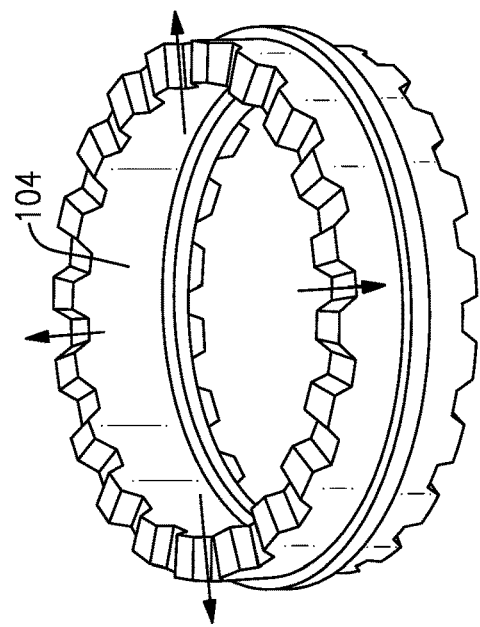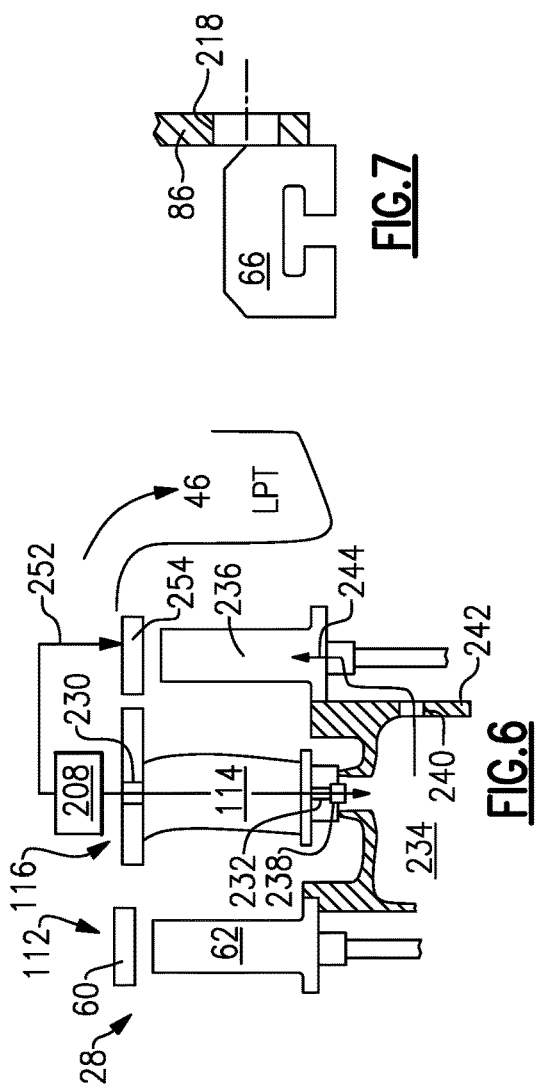

RE-USE AND MODULATED COOLING
FROM TIP CLEARANCE CONTROL
SYSTEM FOR GAS TURBINE ENGINE

BACKGROUND OF THE INVENTION

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. The efficiency of the engine is impacted by ensuring that the products of combustion pass in as high a percentage as possible across the turbine blades. Leakage around the blades reduces efficiency. Thus, a blade outer air seal (BOAS) is provided radially outward of the blades to prevent leakage.

The BOAS is spaced from a radially outer part of the blade by a tip clearance. The BOAS is traditionally associated with a carrier element that is mounted to a case structure. Since the blades, the BOAS, and the structure that support the BOAS are different sizes and/or are formed of different materials, they respond to temperature changes in different manners. As these structures expand at different rates in response to temperature changes, the tip clearance may be reduced and the blade may rub on the BOAS, or the tip clearance may increase reducing efficiency, both of which are undesirable.

Clearance control systems are used to control the tip clearance under different operational conditions. Traditional clearance control systems utilize valves and manifolds to direct fan air to specific engine case locations. The cooling air thermally shrinks the engine case at these locations to improve tip clearance and thus fuel burn. However, these manifolds and valves are large, heavy, and expensive. These systems can also be slow to respond and provide limited clearance improvement. By further reducing tip clearances increasing engine efficiency demands can be met.

SUMMARY OF THE INVENTION

In a featured embodiment, a control system for a gas turbine engine comprises a case structure, a clearance control ring mounted for movement relative to the case structure, an outer air seal mounted to the clearance control ring and facing a first engine component, and a control and valve assembly that receives flow from a flow input source. The control and valve assembly is configured to direct flow into a first cavity positioned radially between the case structure and the outer air seal, and wherein the control and valve assembly is configured to direct flow into a second cavity positioned downstream of the first cavity to interact with a second engine component.

In another embodiment according to the previous embodiment, the control and valve assembly controls a temperature of flow supplied to the first cavity to control movement of the clearance control ring to allow the outer air seal to move in a desired direction to maintain a desired clearance between the outer air seal and the first engine component.

In another embodiment according to any of the previous embodiments, the control and valve assembly directs flow into the second cavity in combination with directing flow into the first cavity, or directs flow into the second cavity independently of directing flow into the first cavity.

In another embodiment according to any of the previous embodiments, the first engine component comprises a first rotating blade and the second engine component comprises a vane. The second cavity is positioned radially between the vane and the case structure.

In another embodiment according to any of the previous embodiments, an intermediate cavity is positioned axially between the first and second cavities. The intermediate cavity is in fluid communication with the first cavity such that flow from the first cavity is directed through the intermediate cavity and into a first inlet to the second cavity.

In another embodiment according to any of the previous embodiments, the second cavity includes a second inlet that is fluidly connected to the control and valve assembly such that flow from the first and second inlets are mixed together in the second cavity.

In another embodiment according to any of the previous embodiments, flow from the second cavity is directed to at least one passage within the vane.

In another embodiment according to any of the previous embodiments, flow exits the passage from the vane and enters a radially inner cavity between the first rotating blade and a second rotating blade that is downstream from the vane, and wherein flow from the radially inner cavity is directed through an opening in a rotating structure and toward the second rotating blade.

In another embodiment according to any of the previous embodiments, flow from the second cavity is directed to a downstream cavity to interact with a second outer air seal and/or a third engine component.

In another featured embodiment, a control system for a gas turbine engine comprises a turbine case structure, a clearance control ring mounted for movement relative to the turbine case structure, an outer air seal mounted to the clearance control ring, and a control and valve assembly that receives flow from a flow input source. The control and valve assembly is configured to direct flow into a first cavity positioned radially between the turbine case structure and the outer air seal. The control and valve assembly controls a temperature of flow supplied to the first cavity to control movement of the clearance control ring to allow the outer air seal to move in a desired direction to maintain a desired clearance between the outer air seal and a first turbine blade, and wherein the control and valve assembly is configured to direct flow into a second cavity positioned downstream of the first cavity to interact with a second turbine component. The control and valve assembly directs flow into the second cavity in combination with directing flow into the first cavity, or directs flow into the second cavity independently of directing flow into the first cavity.

In another embodiment according to the previous embodiment, the second cavity is positioned radially between the case structure and a turbine vane that is downstream of the first turbine blade, and including an intermediate cavity positioned axially between the first and second cavities, the intermediate cavity being in fluid communication with the first cavity such that flow from the first cavity is directed through the intermediate cavity and into a first inlet to the second cavity.

In another embodiment according to any of the previous embodiments, the second cavity includes a second inlet that is fluidly connected to the control and valve assembly such that flow from the first and second inlets are mixed together in the second cavity.

In another embodiment according to any of the previous embodiments, flow from the second cavity is directed into at least one passage within the turbine vane.

In another embodiment according to any of the previous embodiments, flow exits the passage from the turbine vane and enters a radially inner cavity between the first turbine blade and a second turbine blade that is downstream from the turbine vane, and wherein flow from the radially inner cavity is directed through an opening in a rotating structure and toward the second turbine blade.

In another embodiment according to any of the previous embodiments, flow from the second cavity is directed to a third cavity downstream of the second cavity to interact with a second outer air seal and/or a low pressure turbine component.

In another featured embodiment, a method of controlling flow between a compressor section and turbine section in a gas turbine engine comprises mounting a clearance control ring for movement relative to a turbine case structure, mounting an outer air seal to the clearance control ring to face a first turbine blade, directing flow from a flow input source into a first cavity positioned radially between the turbine case structure and the outer air seal, controlling a temperature of flow supplied to the first cavity to control movement of the clearance control ring to allow the outer air seal to move in a desired direction to maintain a desired clearance between the outer air seal and the first turbine blade, and directing flow into a second cavity positioned downstream of the first cavity to interact with a second turbine component.

In another embodiment according to the previous embodiment, a control and valve assembly directs flow into the second cavity in combination with directing flow into the first cavity, or directs flow into the second cavity independently of directing flow into the first cavity.

In another embodiment according to any of the previous embodiments, an intermediate cavity is positioned axially between the first and second cavities, an including fluidly connecting the intermediate cavity with the first cavity such that flow from the first cavity is directed through the intermediate cavity and into a first inlet to the second cavity, and providing the second cavity with a second inlet that is fluidly connected to the control and valve assembly such that flow from the first and second inlets are mixed together in the second cavity.

In another embodiment according to any of the previous embodiments, flow is directed from the second cavity into at least one passage within a turbine vane that is downstream of the first turbine blade.

In another embodiment according to any of the previous embodiments, flow is directed from the second cavity into a third cavity downstream of the second cavity to interact with a second outer air seal and/or a low pressure turbine component.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 2A is a section view of a full hoop clearance control ring, a BOAS assembly positioned between a blade and a case structure, and a control to direct flow to the BOAS assembly and/or to provide supplemental flow for other components.

FIG. 2B is a magnified view of the ring and a portion of the BOAS of FIG. 2A.

FIG. 3 is a view similar to FIG. 2A but showing the assembly in a turbine section.

FIG. 4A is a schematic side view of the ring at a first temperature.

FIG. 4B is a schematic view similar to FIG. 4A but at a decreased temperature relative to the first temperature.

FIG. 4C is a schematic view similar to FIG. 4A but at an increased temperature relative to the first temperature.

FIG. 5 shows an example of a radial spline.

FIG. 6 is a schematic view showing an example where flow is directed to a vane in one turbine stage and then directed to a downstream turbine stage.

FIG. 7 is an enlarged view of the control ring of FIG. 2A in relation to a hole used to direct flow from the BOAS cavity to downstream components.

DETAILED DESCRIPTION

Figure 1:
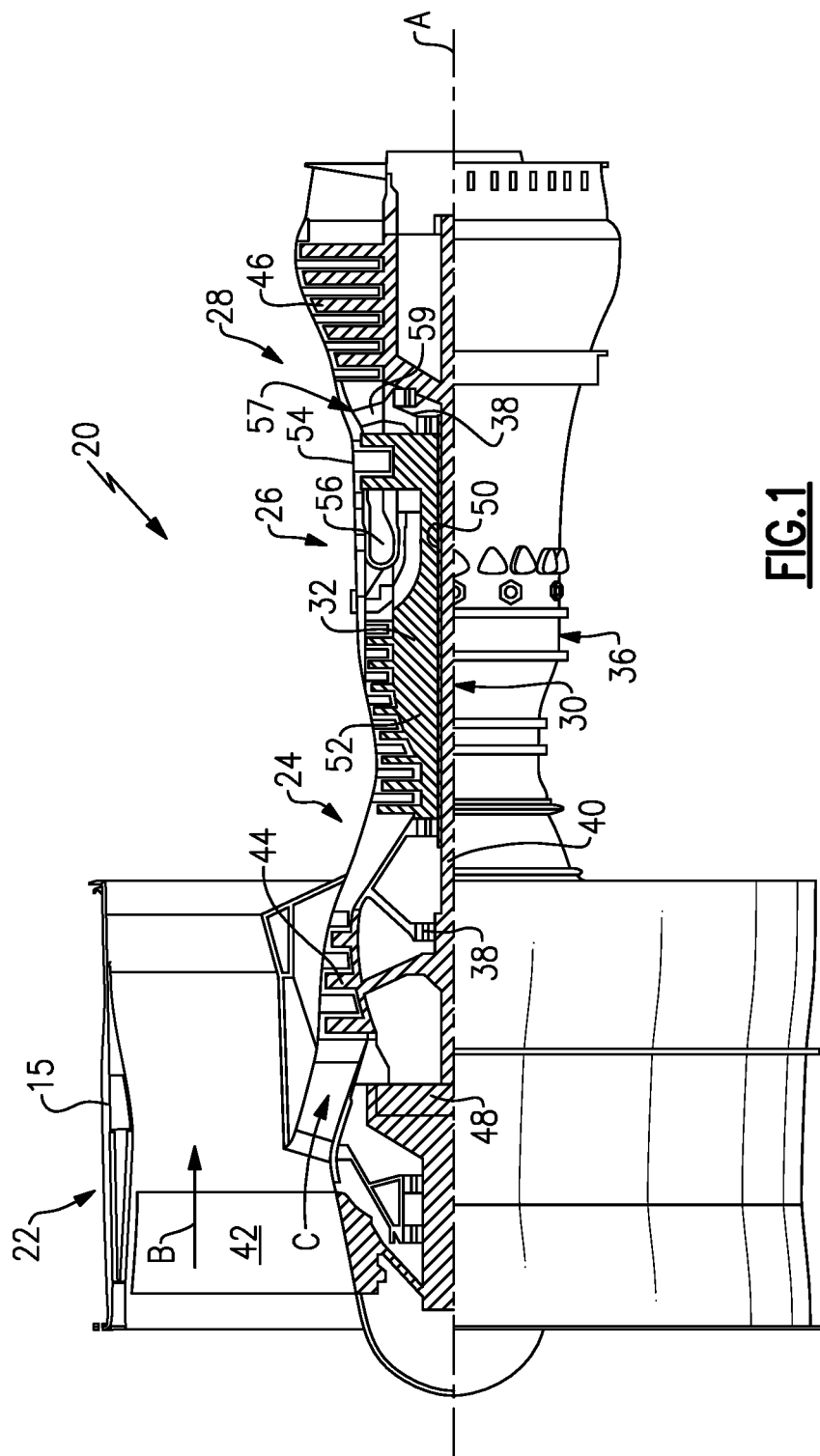
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

FIGS. 2A-2B show an outer air seal assembly 60 spaced by a clearance gap G from a radially outer tip of a rotating blade 62. In one example, the blade 62 is a component of the turbine section 28 as shown in FIG. 1. However, the outer air seal assembly 60 may be used in other engine configurations and/or locations, for example in the compressor sections. The outer air seal assembly 60 includes an outer air seal body 64 that is mounted to a clearance control ring 66. An internal cavity 68 is formed between a case structure 70 and the outer air seal assembly 60. A support structure 72 is associated with the case structure 70 to provide support for the outer air seal assembly 60.

In an active clearance control system, air impinges on the turbine case when activated to cool and shrink the case diameter. This in turn reduces the diameter of the segmented blade outer air seal assembly. The seal body in this application is in segments to prevent thermal fighting between the seal and the turbine case to which the seal ultimately mounts to and which is a full hoop. The turbine case that comprises the full hoop structure is what controls the position of the blade outer air seal. Due to the mass of the turbine case and the thermal environment within which the turbine case operates, the turbine case is slow to respond thermally as the engine power level is increased. The turbine rotor diameter, however, will increase rapidly as the rotational speed and temperature of the engine increases. For this reason, extra clearance must be added between the tip of the blade and the blade outer air seal assembly to prevent rubbing contact between these two structures. However, this extra clearance can adversely affect engine performance.

In one example, the clearance control ring 66 is positioned adjacent the support structure 72 but is not directly tied to the case structure 70 or support structure 72. In one example configuration, the clearance control ring 66 includes a first mount feature 74 and the seal body 64 includes a second mount feature 76 that cooperates with the first mount feature 74 such that the clearance control ring 66 can move within the internal cavity 68 independently of the support structure 72 and case structure 70 in response to changes in temperature. In one example, the clearance control ring 66 is a full hoop ring made from a material with a high thermal expansion coefficient, for example. This new configuration with the clearance control ring 66 reacts much faster than prior active control systems due to the reduced thermal mass and due to being exposed to air from the engine gaspath in contrast to prior systems where the heavy turbine case was exposed to the engine core compartment temperatures.

An injection source 78 injects or delivers cooling fluid flow, for example, air flow, into the internal cavity 68 to control a temperature of the clearance control ring 66 to allow the outer air seal body 64 to move in a desired direction to maintain a desired clearance between the outer air seal body 64 and a tip of the blade 62, i.e. to control the size of the clearance gap G. In one example, the injection source 78 comprises a tube or conduit 78a that receives air flow from a flow input source such as the compressor section 24 (FIG. 1) of the gas turbine engine, for example. Other flow input sources, such as bypass flow, for example, could also be used. As shown in FIG. 2A, a control 80 is configured to deliver the compressor air at a first temperature T1 into the internal cavity 68 and against the clearance control ring 66 to allow the outer air seal body 64 to move in a first direction to maintain a desired clearance during a first operating condition, and is configured to deliver compressor air at a second temperature T2 into the internal cavity 68 and against the outer air seal body 64 to allow the outer air seal body 64 to move in a second direction to maintain a desired clearance during a second operating condition. In one example, the first operating condition comprises a take-off or high load event, and the second operating condition comprises a descending event.

In these example operating conditions, the second temperature T2 is less than the first temperature T1. In this example, the compressor air at the second temperature T2 can comprise cooled cooling air from the compressor exit while the air at the first temperature can comprise uncooled compressor exit air. The control 80 comprises a microprocessor and/or control unit that is programmed to deliver air flow at the first T1 or second T2 temperature as needed dependent upon the engine operating condition. The control C can further include valves V, flow conduits, and/or heat exchangers as needed to deliver the compressor air at the desired temperature. The control 80 delivers higher temperature air T1 into the cavity 68 when the clearance control ring 66 is to increase in diameter and delivers lower temperature air T2 into the cavity 68 when the clearance control ring 66 is to decrease in diameter. It should be understood that while two different temperatures are discussed as examples, the system is infinitely variable and the system can deliver fluid at any desired temperature.

The case structure 70 includes an opening 82 (FIG. 3) to receive the conduit 78a which directs compressor air into the cavity 68. The support structure 72 includes a first radial wall portion 84 extending radially inward from the case structure 70 and a second radial wall portion 86 axially spaced from the first radial portion 84 to define the internal cavity 68. The opening 82 is positioned axially between the first 84 and second 86 radial portions. The case structure 70 includes trenches or grooves 88 adjacent to each of the first 84 and second 86 radial wall portions.

The seal body 64 includes a seal support portion 90 and a ring mount portion 92. The grooves 88 receive the seal support portion 90 to seat the outer air seal assembly 60 relative to the case structure 70. These comprise tight radial fits to the case structure 70 at the grooves 88. The clearance control ring 66 is radially moveable relative to the first 84 and second 86 radial wall portions in response to temperature changes via the connection interface to the ring mount portion 92. A main seal portion 94 extends from the ring mount portion 92 to face the blade 62.

The first 74 and second 76 mount portions are shown in greater detail in FIG. 2B. One of the first 74 and second 76 mount features comprises a slot 98 and another of the first 74 and second 76 mount features comprises an extension 100 that is received within the slot 98 to couple the outer air seal body 64 and clearance control ring 66 together. In the example shown, the clearance control ring 66 includes the slot 98 and the seal body 64 includes the extension 100; however, the reverse configuration could also be used. In one example, the slot 98 and the extension 100 comprise a key-shape, with each of the slot 98 and extension 100 having a first portion 98a, 100a extending in a radial direction and a second portion 98b, 100b extending in an axial direction. This type of configuration provides a floating connection interface that fully supports and properly locates the seal 64 while still controlling the seal 64 to move radially inwardly and outwardly as needed.

As shown in FIGS. 4A-4B, when the clearance control ring 66 is in a first temperature, the ring has a first diameter D1. When the control 80 delivers lower temperature air T2 (FIG. 4B) to the cavity 68, the clearance control ring 66 contracts to a second diameter D2 that is less than the first diameter D1. This allows the seal body 64 to move radially inwardly toward the blade 62. When the control 80 delivers higher temperature air T1 (FIG. 4C) to the cavity 68, the clearance control ring 66 expands to a third diameter D3 that is greater than the first diameter D1. This allows the seal body 64 to move radially outwardly away from the blade 62. Thermal growth rate $T_G$ is calculated as $T_G = R\alpha\Delta T$ where R is the radius of the ring, $\Delta T$ is the difference between the initial and final temperatures, and a is a thermal coefficient of expansion determined based on the material of the ring.

In one example, the control ring 66 optionally includes one or more through holes 96 (see dashed lines in FIG. 2B that direct air through the body of the control ring 66.

In one example, the outer air seal body 64 comprises a segmented ring and the clearance control ring 66 comprises a full hoop ring. The segmented ring includes a plurality of body segments that are circumferentially arranged to form the annular outer air seal assembly 60 as known. In one example, the full hoop ring comprises a radial spline 104 similar to that shown in FIG. 5. In the subject clearance control system, the radial spline may include additional splines or a reduced number of splines than that which is shown in FIG. 5.

Once the flow has been used to control movement of the control ring 66, the subject invention provides a control system 200 that uses supplemental flow alone or in combination with flow from the BOAS cavity 68 to cool downstream engine components such as a high pressure turbine vane, blade outer air seal, second stage turbine blade, etc. As shown in FIG. 2A, the control system 200 includes a first control 80 and first valve 202 that are configured to deliver compressor flow from compressor section 24 into the internal cavity 68 of a first outer air seal assembly 60. The control 80 and valve 202 cooperate to deliver flow at a desired temperature into the cavity 68 to control movement of the control ring 66 to maintain a desired tip clearance as discussed above. In one example, flow of various temperatures T1, T2 can be mixed via the control 80 and valve 202 to provide the desired temperature.

The control system 200 further includes a second control 204 and a second valve 206 that cooperate to deliver supplemental flow from the compressor section 24 to a plenum 208 (FIG. 3) that is downstream of the cavity 68 of the first outer air seal assembly 60. A conduit 210 connects the second control 80 and second valve 206 to the compressor section 24 and another conduit 212 directs flow from the second valve 206 to an injection member 214 that directs flow into the plenum 208 via an opening 216 in the case structure 70.

In one example, flow directed through opening 216 is mixed in the plenum 208 with flow that was used to control temperature of the clearance control ring 66 of the first outer air seal assembly 60. As shown in FIG. 2A, a hole 218 is formed within the radial wall portion 86 of the case support structure 72. The hole 218 is in fluid communication with cavity 68 and directs flow from cavity 68 into a downstream/intermediate cavity 220 that is between first blade outer air seal 94 and second stage vane 114 as shown in FIG. 3. Flow through the hole 218 can vary in relation to movement of the clearance control ring 66. FIG. 7 shows an example where the clearance control ring 66 covers approximately half of the hole 218. As the clearance control ring 66 is subjected to higher temperature levels, the clearance control ring 66 moves radially outwardly to cover a greater portion of the hole 218. As the clearance control ring 66 is subjected to cooling temperatures, the clearance control ring 66 moves radially inwardly to open a greater area of the hole 218.

The second stage vane 114 has a first vane arm 222 and a second vane arm 224 that are on opposing sides of a vane platform 226, and which the connect the vane 114 to the case 70. The plenum 208 is formed between the case 70, the platform 226, and the first 222 and second 224 vane arms. A hole 228 is formed in the first vane arm 222. The hole 228 receives flow from intermediate cavity 220 and directs flow into the plenum 208 to be mixed with flow entering the plenum 208 through hole 216.

In one example configuration shown in FIG. 6, the outer air seal assembly 60 is positioned within the turbine section 28 downstream of the compressor section 24. The turbine section 28 includes a plurality of turbine stages with the first outer air seal assembly 60 being positioned between a vane 110 of a first turbine stage 112 and the vane 114 of second turbine stage 116. As discussed above, the plenum 208 is located radially outwardly of the vane 114.

In one example, the flow from the plenum 208 can be directed through a hole 230 in the platform 226 to cool the vane 114. Flow can then exit the vane 114 via hole 232 into cavity 234. Cavity 234 is positioned between the blade 62 of the first turbine stage 112 and a blade 236 of the second turbine stage 116. In one example, the flow exits hole 232 via a turbine on-board injector 238 that is mounted to the vane 114 and which swirls flow in a direction of the rotating cavity 234. The flow can then be directed from the cavity 234 through a hole 240 formed in a cover plate 242 associated with blade 236 to cool the blade 236 as indicated at 244.

In another example shown in FIG. 3, flow can exit plenum 208 via an opening 250 formed in the second vane arm 224. Flow exiting this opening 250 enters a mixing cavity 252. Flow can then exit mixing cavity 252 to cool a second blade outer air seal assembly 254 spaced from a tip of blade 236 (FIG. 6). Flow can also optionally be directed from mixing cavity 252, through hole 256, and then toward the low pressure turbine 46.

As such, subject invention provides a control system 200 that can be used to direct flow from the compressor section 24 to various other engine components in an efficient manner. The control system 200 utilizes controllers and valves to control flow to outer air seal assemblies, blades, vanes, etc. that are associated with the high and low pressure turbines. The subject invention further provides a high pressure turbine internal ring comprising a clearance control ring 66 connected to an outer air seal body 64, where the control ring 66 is made from a material with a high thermal expansion coefficient. The control ring 66 is configured to be mounted to the air seal body 64 in an isolated manner such that the connecting mass is much lower than that of a turbine case structure 70. The control ring 66 is free floating on a radial spline such that the control ring's movement is not restricted. When the system is activated, cooled cooling air from the compressor, which is approximately 50-400 degrees Fahrenheit cooler than the air surrounding the control ring, is pumped into the internal cavity 68 and channeled around or through the control ring 66 to rapidly reduce the ring temperature and diameter as needed. In the same manner, during specified operating conditions, the control directs uncooled compressor exit air to rapidly increase the temperature of the control ring and diameter as needed.

The rapid response of the system allows for overall tighter high pressure turbine clearances to be set which yields an improved thrust specific fuel consumption (TSFC). In one simulated example, the TSFC increases as much as 0.4% with the use of the subject control ring 66. The subject system is also lighter and less expensive than traditional systems, which use large pipes, valves, and complex manifolds. The subject system uses small diameter plumbing and valves without the complex manifold. The subject system also allows both heated and cooled air to be channeled through the control ring 66 to increase and decrease the diameter of the ring as needed.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A control system for a gas turbine engine comprising:
a case structure;
a clearance control ring mounted for movement relative to the case structure, said clearance control ring moving independently of said case structure;
an outer air seal mounted to the clearance control ring and facing a first engine component;
a control and valve assembly that receives flow from a flow input source, wherein the control and valve assembly includes a first valve configured to direct flow into a first cavity positioned radially between the case structure and the outer air seal and in contact with the clearance control ring, and wherein the control and valve assembly includes a second valve configured to direct flow into a second cavity positioned downstream of the first cavity to interact with a second engine component;
wherein the second valve directs flow into the second cavity in combination with flow directed into the first cavity through the first valve and then into the second cavity, or directs flow into the second cavity without flow directed through the first valve and into the first cavity;
wherein the first engine component comprises a first rotating blade and the second engine component comprises a vane, and wherein the second cavity is positioned radially between the vane and the case structure; and
including an intermediate cavity positioned axially between the first and second cavities, the intermediate cavity being in fluid communication with the first cavity such that flow flout the first cavity is directed through the intermediate cavity and into a first inlet, to die second cavity.

2. The system according to claim 1 wherein the control and valve assembly controls a temperature of flow supplied to the first cavity to control movement of the clearance control ring to allow the outer air seal to move in a desired direction to maintain a desired clearance between the outer air seal and the first engine component.

3. The system according to claim 1 wherein the second cavity includes a second inlet that is fluidly connected to the control and valve assembly such that flow from the first and second inlets are mixed together in the second cavity.

4. The system according to claim 3 wherein flow from the second cavity is directed to at least one passage within the vane.

5. The system according to claim 4 wherein flow exits the passage from the vane and enters a radially inner cavity between the first rotating blade and a second rotating blade that is downstream from the vane, and wherein flow from the radially inner cavity is directed through an opening in a rotating structure and toward the second rotating blade.

6. The system according to claim 3 wherein flow from the second cavity is directed to a downstream cavity to interact with a second outer air seal and/or a third engine component.

7. A control system for a gas turbine engine comprising:
a turbine case structure;
a clearance control ring mounted for movement relative to the turbine case structure, said clearance control ring moving independently of said case structure; an outer air seal mounted to the clearance control ring;
a control and valve assembly that receives flow from a flow input source, wherein the control and valve assembly includes a first valve configured to direct flow into a first cavity positioned radially between the turbine case structure and the outer air seal and in contact with the clearance control ring, and wherein the control and valve assembly controls a temperature of flow supplied to the first cavity to control movement of the clearance control ring to allow the outer air seal to move in a desired direction to maintain a desired clearance between the outer air seal and a first turbine blade, and wherein the control and valve assembly including a second valve configured to direct flow into a second cavity positioned downstream of the first cavity to interact with a second turbine component;

wherein the second valve directs flow into the second cavity in combination with flow directed through the first valve into the first cavity and then into the second cavity, or directs flow into the second cavity without flow directed through the first valve and into the first cavity; and wherein the second cavity is positioned radially between the case structure and a turbine vane that is downstream of the first turbine blade, and including an intermediate cavity positioned axially between the first and second cavities, the intermediate cavity being in fluid communication with the first cavity such that flow from the first cavity is directed through the intermediate cavity and into a, first inlet to the second cavity.

8. The system according to claim 7 wherein the second cavity includes a second inlet that is fluidly connected to the control and valve assembly such that flow from the first and second inlets are mixed together in the second cavity.

9. The system according to claim 8 wherein flow from the second cavity is directed into at least one passage within the turbine vane.

10. The system according to claim 9 wherein flow exits the passage from the turbine vane and enters a radially inner cavity between the turbine blade and a second turbine blade that is downstream from the turbine vane, and wherein flow from the radially inner cavity is directed through an opening in a rotating structure and toward the second turbine blade.

11. The system according to claim 8 wherein flow from the second cavity is directed to a third cavity downstream of the second cavity to interact with a second outer air seal and/or a low pressure turbine component.

* * * * *